March 26, 1968    E. SCHIMMEISTER    3,375,410
DISTRIBUTION PANEL FOR RELATIVELY THIN ELECTRICAL COMPONENTS
Filed Feb. 15, 1967
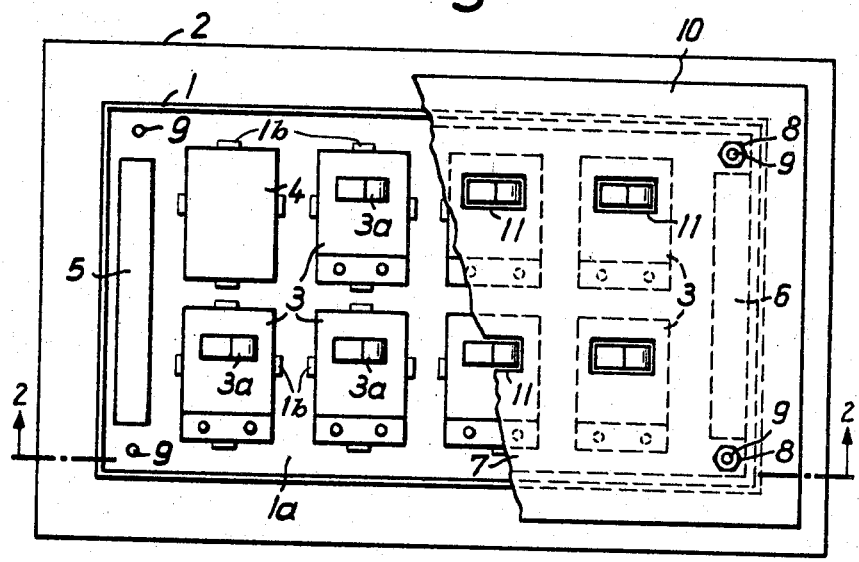
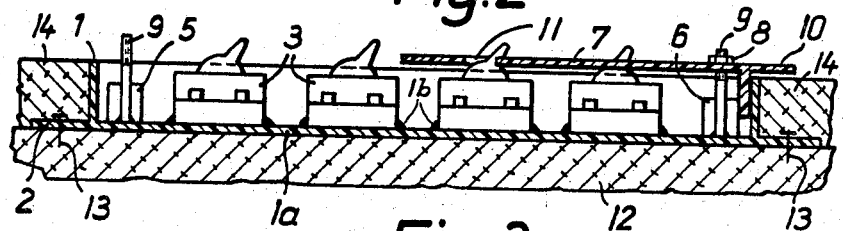
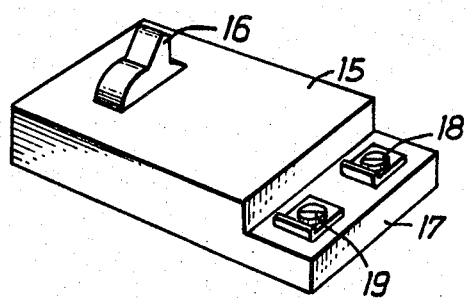
Inventor:
Erwin Schimmeister
By: Spencer & Kaye
Attorneys

United States Patent Office 3,375,410
Patented Mar. 26, 1968

3,375,410
DISTRIBUTION PANEL FOR RELATIVELY THIN ELECTRICAL COMPONENTS
Erwin Schimmeister, Fischbeck uber Hameln, Germany, assignor to Allgemeine Elektricitats-Gesellschaft, Berlin, Germany
Filed Feb. 15, 1967, Ser. No. 616,218
5 Claims. (Cl. 317—119)

ABSTRACT OF THE DISCLOSURE

A distribution panel which is as thin as a layer of plaster is provided for mounting circuit breakers, bell transformers, and the like on a wall without the necessity of recessing the distribution panel into the wall. The cover plate for the distribution panel has removal portions which serve as apertures for the handles of switches contained therewithin.

Background of the invention

For the purpose of protecting the electrical circuits in a private home, automatic circuit breaker switches are required which are mounted nowadays chiefly on meter boards but which are also frequently mounted in distribution panels. If it is intended that the circuit breaker switches be mounted on the wall of an apartment, they are generally mounted in distribution panels which, for architectural reasons, are recessed into the wall. These prior art distribution panels have the disadvantage of requiring a relatively large amount of chiseling work in the wall. In addition, there is frequently a supporting member in the location where it is desirable to place the panel, and the panel has to be placed in a less desirable location, since the supporting members cannot be cut or recessed without weakening the structure. While the now customary narrow construction of automatic circuit breaker switches does allow for the distribution panels to be kept small with respect to the lateral dimensions thereof, the range of depth thereof cannot be reduced in the presently used arrangement of placing the switches in series side-by-side.

Summary of the invention

The present invention relates to a distribution panel for housing narrow automatic circuit breaker switches and other relatively thin electrical components such as time-limit switches, bell transformers, etc., without the drawbacks of the above-noted prior art distribution panels.

In accordance with the present invention, the distribution panel is provided as a flat box, preferably made of plastic, and having a depth approximately equal to the width of the narrow switches. The distribution panel may be covered with a lid containing removable portions which can be broken out to provide apertures for the manual control members of the switches or other electrical components, which are secured to the bottom of the distribution panel with their thin dimension perpendicular to the bottom of the distribution panel.

A distribution panel of this type may be secured to a bare masonry wall and enclosed within the plaster without the necessity of cutting a recess in the supporting wall. Since the depth of the distribution panel box is hardly greater than the thickness of the plastered masonry, due to the narrowness of the electrical components therewithin, the edge of the box will project beyond the plaster only by a few millimeters at most and the box will therefore not represent a disturbing structural element. Although it will be larger in the lateral dimensions than the prior art distribution panels due to the fact that the electrical components are mounted on their sides, this does not constitute a disadvantage either from the technical or from the architectural point of view.

The distribution panel is preferably provided with a continuously extending flange positioned in the plane of the bottom which may be secured to a masonry wall by nailing or the like. When the panel is mounted on a very thin wall, for example a pressboard wall, it is preferable to employ a panel having a flange which is disposed at the edge of the panel and can be inserted into a recess of the wall. In case of a distribution panel for wall mounting, the walls of the panel are provided at the upper edges thereof with score lines so that portions may be broken off to shorten the edges after the application of plaster. The cover of the panel is preferably provided with an overlapping frame which may be clamped to the inner sides of the walls or screwed upon bolts which are positioned in the panel. Instead of a frame which is attached to the cover, it is equally possible to use a frame which is separate from the cover and which may be clamped into the panel. The distribution panel is adapted in size to the number of electrical components to be contained therewithin. The narrow automatic circuit breakers are mounted in the distribution panel with their manual control members projecting from the wide side thereof, and with their connecting terminals being accessible from the front. The wide side which is opposite the side carrying the manual control member serves as a fastening surface for the switch. Mounted at this surface, or at the narrow sides of the panel, are fastening means for supporting the switch on the bottom of the distribution panel.

Brief description of the drawings

FIGURE 1 is a plan view of one illustrative embodiment of the invention.

FIGURE 2 is a vertical cross-sectional view taken substantially along the plane defined by the reference line 2—2 in FIGURE 1.

FIGURE 3 is a perspective view of an automatic circuit breaker adapted to be contained in the distribution panel of this invention.

Description of the preferred embodiments

The distribution panel shown in FIGURE 1 comprises a flat box 1 which has a continuous flange 2 in the plane of the bottom surface 1a thereof. The box is preferably made of plastic and the flange serves for fastening the box to a brick wall. The box may be fastened to a wall 12 with the aid of nails 13 (FIGURE 2) which are driven through the flange 2. The depth of the box is so chosen that the edges will not project materially beyond the narrow automatic circuit breaker switches 3 which are secured flush with the bottom of the box. It is also possible to install in the box other electrical components, such as, for example, bell transformers or time-limit switches, which have the same dimensions with respect to the housing as the circuit breaker switches. In the embodiment illustrated, a bell transformer 4 is provided. The switches and the bell transformer may be retained in the box with the aid of clamping means 1b molded on the bottom of the box, or by any other suitable means. Terminal strips 5 and 6, respectively, are secured at two oppositely-positioned sides of the box. At the points where the terminal strips 5 and 6 are positioned, the walls of the box are provided with apertures (not shown) for introducing the electric wires. The top of the box is closed by means of a cover 7 which is secured, with the aid of nuts 8, to bolts 9 in the bottom of the box. The cover is provided with a frame 10 which projects beyond the walls of the box so as to form another flange. The regions of cover 7 above the manual control members 3a of the switches 3 are adapted to be broken away to form apertures 11. The manual control members 3a of switches 3 extend through these apertures, projecting beyond the surface of the lid, and may thereby be actuated from the outside. The placement of the distribution panel in the plaster is apparent from the cross-sectional view of FIGURE 2. The box, which is secured to the wall 12 with the aid of the nails 13, terminates flush with the edge of the plaster 14 so that the entire distribtuion panel is contained within the layer of plaster and will hardly project outwardly beyond the plaster.

An automatic circuit breaker switch having the narrow form of construction, which may be contained within the extremely thin distribution panel of this invention, may have the configuration shown in FIGURE 3. The switch housing 15 is square-shaped with two relatively long sides and one side which is considerably shorter. A manual control member 16 is provided as a toggle and protrudes from the upper broad side of the switch housing. A narrower shoulder portion 17, including connecting terminals 18 and 19, is disposed at one end of the housing. The lower broad side of the switch housing serves for the attachment of the switch on the distribution panel according to FIGURES 1 and 2.

It will be understood that the above description of the present invention is susceptible to various modifications, changes, and adaptations, and the same are intended to be comprehended within the meaning and range of equivalents of the appended claims.

I claim:
1. An electrical distribution panel for housing electrical switch elements which are relatively thin in one dimension, comprising, in combination:
   (A) a flat base panel;
   (B) wall means joined to said base panel at right angles thereto to form a flat box, the depth of said flat box being approximately equal to the relatively thin dimension of said electrical switch elements;
   (C) said electrical switch elements being attachable to said base panel with the thin dimension of said electrical switch elements perpendicular to said base panel;
   (D) a flat cover panel including a plurality of removable portions which can be removed from said cover panel so as to provide at least one aperture therein; and
   (E) means attaching said flat cover panel to the flat box formed by said base panel and said wall means.

2. A distribution panel as defined in claim 1, and further comprising a flange positioned in the plane of said base panel.

3. A distribution panel as defined in claim 1, and further comprising a flange positioned in the plane of said cover panel.

4. A distribution panel as defined in claim 1, wherein the lateral dimensions of said box are selected to contain a predetermined number of said electrical switch elements.

5. A distribution panel as defined in claim 4, wherein said electrical switch elements comprise narrow automatic circuit breaker switches which contain a manual control member at the uppermost broad side thereof, and connecting terminals which are accessible from the front of the box; and wherein said base panel further comprises means which fasten said switch elements to said base panel.

References Cited

UNITED STATES PATENTS

| | | | |
|---|---|---|---|
| 2,225,791 | 12/1940 | Nau et al. | 200—168 |
| 2,978,613 | 4/1961 | Hein | 317—119 |
| 3,299,199 | 1/1967 | Mattingly | 174—58 |
| 3,312,770 | 4/1967 | McKenna et al. | 174—48 |

ROBERT K. SCHAEFER, *Primary Examiner.*

H. O. JONES, *Assistant Examiner.*